No. 855,528. PATENTED JUNE 4, 1907.
B. F. PINSON, JR.
TRUSS BRACED TREE.
APPLICATION FILED DEC. 10, 1906.
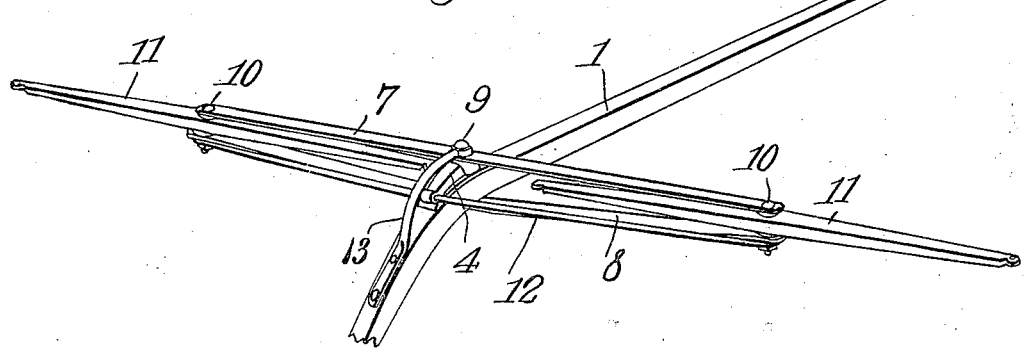
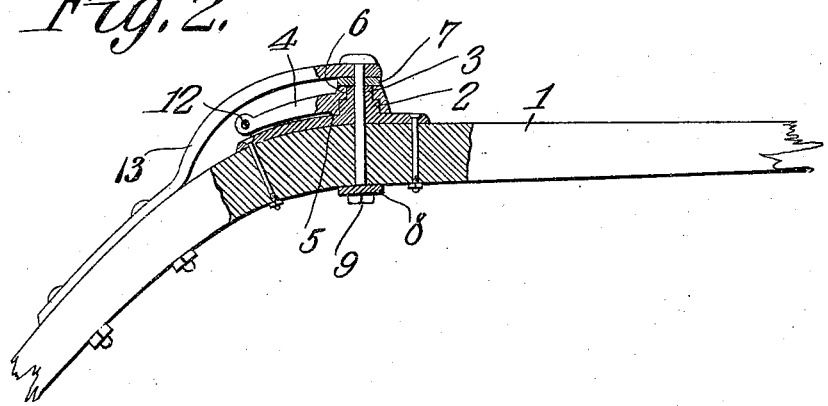
WITNESSES:
Benjamin F. Pinson Jr.,
INVENTOR.
By
ATTORNEYS

UNITED STATES PATENT OFFICE.

BENJAMIN F. PINSON, JR., OF SKIATOOK, INDIAN TERRITORY.

TRUSS-BRACED TREE.

No. 855,528.  Specification of Letters Patent.  Patented June 4, 1907.

Application filed December 10, 1906. Serial No. 347,195.

*To all whom it may concern:*

Be it known that I, BENJAMIN F. PINSON, Jr., a citizen of the United States, residing at Skiatook, District 4, Indian Territory, have invented a new and useful Truss-Braced Tree, of which the following is a specification.

This invention has relation to truss-braced trees and it consists in the novel construction and arrangement of its parts as hereinafter shown and described.

The object of the invention is to provide a tree having a truss rod brace.

The stud over which the truss rod passes is located at the middle of the tree and extends rearwardly from the same. Said stud is provided with trunnion bearings which receive trunnions mounted upon the vehicle pole. The double tree comprises an upper and lower metallic strip, the former of which is attached directly to said stud and the latter passes under the pole and is provided with a perforation for the reception of the pivot bolt of the tree. The outer ends of the said strips are connected together by bolts and swingletrees are pivoted between the ends of the said strips upon said bolts and lie substantially in the same horizontal plane as the pole.

In the accompanying drawing:—Figure 1 is a perspective view of the tree, and Fig. 2 is a section of the same.

The pole 1 is provided with the concentrically arranged trunnions 2 and 3 which differ in transverse diameter, the trunnion 2 being larger than the said trunnion 3 and being located below the same. The stud 4 is provided with the bearings 5 and 6 which are adapted to receive the trunnions 2 and 3 respectively. The strip 7 rests upon the stud 4 over the bearings 5 and 6 thereof. The strip 8 is pivoted at its middle upon the bolt 9 (upon which strip 7 and stud 4 are also pivoted) and is secured at its outer ends to the ends of the strip 7 by means of bolts 10. The swingletrees 11 are pivoted upon the bolts 10 and lie on opposite sides of the pole 1 and between the strips 7 and 8. The truss rod 12 is attached at its ends to the bolts 10, 10 and passes over the free end of the stud 4. The iron 13 is attached to the pole 1 and is provided at its forward end with a perforation which receives the pivot bolt 9. The stud 4 is curved down along its longitudinal axis and lies in close proximity to the rear portion of the tongue 1 and the truss rod 12 is attached to the lower portions of the bolts 10 and by reason of the longitudinal curvature of the said stud, the said truss rod is not distorted out of alinement to any considerable degree. It will thus be observed that a double strip double tree is provided with swingletrees mounted between the strips and which lie substantially in the same horizontal plane as the tongue, consequently, the draft upon the swingletree is substantially in horizontal alinement with the tongue and as the strips are arranged on opposite sides of the tongue the draft is divided between the upper and lower portions of the tongue. Also in view of the fact that the inner ends of the swingletrees lie between the upper and lower strips it is impossible for the reins to catch under the said ends of the said trees. Also by reason of the fact that trunnions are provided upon the tongue which enter bearings provided in the stud and as said bearings and trunnions differ in diameter the strain between the said parts is distributed over considerable surface and the parts are more firmly braced and will not wear rapidly. The device as an entirety possesses strength and durability without adding excessive weight to the vehicle or unsightly appearance.

Having described my invention what I claim as new and desire to secure by Letters-Patent is:—

A draft appliance comprising a tongue, concentric trunnions of different diameters mounted upon the tongue, a stud having bearings receiving said trunnions, a tree engaging said stud and a truss rod attached at its ends to the tree and engaging said stud.

In testimony that I claim the foregoing as my own, I have hereto affixed my signature in the presence of two witnesses.

BENJAMIN F. PINSON, JR.

Witnesses:
C. H. CLEVELAND,
E. M. JANEWAY.